United States Patent
Anderson (10) Patent No.: US 7,152,413 B1
(45) Date of Patent: Dec. 26, 2006

(54) THERMAL ENERGY TRANSFER UNIT AND METHOD

(76) Inventor: R. David Anderson, 110 Pembroke, Wichita Falls, TX (US) 76301-3932

( * ) Notice: Subject to any disclaimer, the term of this patent is extended or adjusted under 35 U.S.C. 154(b) by 0 days.

(21) Appl. No.: 11/297,596

(22) Filed: Dec. 8, 2005

(51) Int. Cl.
*F25D 17/02* (2006.01)

(52) U.S. Cl. ................................. 62/118; 62/434

(58) Field of Classification Search ............. 62/59, 62/99, 118, 119, 185, 201, 430, 434, 435; 165/62
See application file for complete search history.

(56) References Cited

U.S. PATENT DOCUMENTS

| | | | | |
|---|---|---|---|---|
| 4,545,214 A | * | 10/1985 | Kinoshita | 62/160 |
| 4,727,726 A | * | 3/1988 | Mitani et al. | 62/238.6 |
| 4,735,064 A | | 4/1988 | Fischer | 62/430 |
| 4,909,041 A | * | 3/1990 | Jones | 62/99 |
| 4,916,916 A | | 4/1990 | Fischer | 62/199 |
| 4,940,079 A | * | 7/1990 | Best et al. | 165/236 |
| 4,964,279 A | * | 10/1990 | Osborne | 62/59 |
| 5,042,262 A | * | 8/1991 | Gyger et al. | 62/64 |
| 5,211,029 A | | 5/1993 | Uselton et al. | 62/324 |
| 5,255,526 A | | 10/1993 | Fischer | 62/59 |
| 5,467,812 A | | 11/1995 | Dean et al. | 165/2 |
| 5,647,225 A | | 7/1997 | Fischer et al. | 62/434 |
| 5,678,626 A | | 10/1997 | Gilles | 165/62 |
| 5,682,752 A | | 11/1997 | Dean | 62/59 |
| 5,816,062 A | * | 10/1998 | Weng et al. | 62/201 |
| 6,253,563 B1 | * | 7/2001 | Ewert et al. | 62/235.1 |
| 6,877,342 B1 | * | 4/2005 | Weng | 62/59 |

FOREIGN PATENT DOCUMENTS

EP    0978696 A1 *  7/2003

* cited by examiner

*Primary Examiner*—Mohammad M. Ali
(74) *Attorney, Agent, or Firm*—Charles D. Gunter, Jr.

(57) ABSTRACT

A thermal energy transfer unit is provided for conventional Freon air conditioning. One or several thermal energy transfer units are operatively interconnected to one or several conventional air condition systems and share a common energy storage tank. Each thermal energy transfer unit converts energy from the compressor and condensing coil of the conventional air conditioner and stores it in the common energy storage tank when electricity is in low demand. Each thermal energy transfer unit retrieves stored energy from the common storage tank and provides air conditioning without the use of the compressor when electricity is in high demand. Each thermal energy transfer unit can be disabled to allow the air conditioning unit to perform as if they and the energy storage tank were not connected. One or all of the units can be disabled without affecting the performance or purpose of the others.

10 Claims, 7 Drawing Sheets

THERMAL ENERGY TRANSFER UNIT AND METHOD

BACKGROUND OF THE INVENTION

1. Field of the Invention

The present invention relates generally to a thermal energy transfer system for cooling a structure which can easily be added to an existing Freon compression air conditioning system which will replicate the operation of a conventional condensing unit while using only energy which was previously stored in the system and which does not require modification of the components of the air conditioning system normally located within the structure being cooled.

2. Description of the Prior Art

Because the utility electrical industry has incorporated reduced electrical rates in off-peak hours when demand is low, the electrical consumer has found it advantageous to purchase and store air conditioning in the off-peak hours and use it during peak hours. There are many methods of storing and retrieving thermal energy in an insulated tank. All require an insulated tank that contains a substance in which the thermal energy is stored.

One method utilizes a liquid that simply stores the thermal energy by reducing the temperature of the liquid. For example, if this liquid is water, one pound of water stores approximately one BTU per degree of Fahrenheit temperature reduction. The energy is stored by removing heat from the liquid by various methods. The energy is recovered by circulating the cooled liquid into a heat exchanger during peak hours where it absorbs heat because of the low temperature of the liquid.

Another method of thermal energy storage involves the freezing of the liquid inside the insulated tank to its solid state by various methods. The heat stored per pound of liquid is much greater because of the change of state of the liquid to solid. If water is the liquid, one pound of water stores approximately 144 BTU's per degree of Fahrenheit temperature reduction, the phenomenon being referred to as the latent heat. The energy is recovered from storage by circulating a substance (sometimes the same melted liquid) through or around the cold solid transferring heat to the solid until it is all melted back to its liquid state.

Another method of thermal energy storage is a combination of the two previously described methods. Thermal energy is stored by transferring heat out of a liquid until a portion of the liquid solidifies to a solid state resulting in a slurry of solid particles floating in a liquid. Thermal energy is retrieved by circulating the liquid of the slurry to the area to be cooled where heat is added to the cool liquid. The heat is rejected to the particles of solid floating in the slurry.

Because of problems involved in creating the above slurry and thus storing thermal energy, another method has evolved which uses sealed spherical balls containing a liquid that changes to its solid state to store thermal energy. These balls are contained in a liquid that freezes at a much lower temperature than the liquid contained in the balls. Energy is stored by removing heat from the low temperature liquid until the liquid inside the balls changes to the solid state. Energy is recovered by circulating the low temperature liquid to the area to where heat is added and then rejected to the melting of the liquid inside the balls. U.S. Pat. No. 4,768,579, issued to Patry, is an example of this method.

All of these methods have advantages and disadvantages, depending upon the particular end applications, methods of storing and retrieving heat, and commercial considerations of tank size, tank location, etc. All of these methods retrieve the stored energy by circulating a liquid to transfer the heat removed from the air conditioned area to the tank containing the material in which thermal energy is stored.

It has long been recognized that using Freon for the conversion and transfer of thermal energy was beneficial because the conventional method of air conditioning could be used when required during off-peak hours. Past efforts for this method of conversion and storage of thermal energy always used a conventional condensing unit. Past efforts for this method always used a coil submerged in liquid contained in an insulated tank for the thermal energy conversion and storage. These submerged coils had Freon flow through them to freeze the liquid to its solid state for energy storage. The same coil was used for stored energy recovery by flowing Freon through the coil where it condensed to its liquid state, thus adding heat to the frozen liquid in the tank. This method of converting and storing thermal energy is known informally as the "ice on pipe" technique and is described in the American Society of Heating, Refrigeration and Air-Conditioning Engineers Handbook 1998–2001. When using Freon for "ice on pipe" thermal energy conversion and storage, the problem of Freon management becomes increasingly important. Because the coil in the tank is relatively large, it holds large amounts of Freon. The system as a whole has to operate in three different modes:

1. thermal energy storage—making ice;
2. thermal energy retrieval—air conditioning from ice; and
3. conventional air conditioning.

Each mode requires a different mass of Freon to be in circulation because of the size and use of the coil inside the storage tank. The solution to the problem of Freon management in "ice on pipe" storage systems has been cumbersome with a number of different solutions having been proposed over the years. At least the following issued U.S. Patents deal with this problem: U.S. Pat. No. 4,735,064 Fischer; U.S. Pat. No. 5,211,029 Dean et al; U.S. Pat. No. 4,916,916 Fischer; U.S. Pat. No. 5,255,526 Fischer; U.S. Pat. No. 5,647,225 Fischer; U.S. Pat. No. 5,467,812 Dean et al; U.S. Pat. No. 5,678,626 Dean et al; U.S. Pat. No. 5,682,752 Dean et al.

These solutions are complicated and eliminate the possibility of multiple air conditioning systems using a common storage tank. It is more expensive to provide multiple thermal energy tanks than to provide one tank of the combined volume. These solutions also eliminate any advantage which other thermal energy storage methods might offer. Such systems require the water that is frozen and the coil inside it to be located near the Freon compressor because of pressure losses in the Freon tubing between the compressor and the coil, compressor lubricating oil loss and entrapment in long runs of Freon tubing between the coil and compressor. The additional cost and inconvenience of the copper tubing connecting the coil and the compressor must be taken into consideration when the two are located apart at a relatively great distance. All such systems require one tank for each existing condensing unit and the location of the tank to be relatively close to the condensing unit.

In a typical installation, there are many buildings that are air conditioned by several conventional Freon air conditioners (usually one for each zone inside the building). As a result, a need has arisen for a method for several condensing units to be converted for thermal storage, which method also allows the condensing units to share the same storage tank. Because it has become common practice to mount conventional condensing units on the roof of the structure, a need has arisen for the common energy storage tank to be mounted on the ground and not on the roof due to the prohibitive weight of the storage tank.

Because there are several methods of storing thermal energy in a tank, there is a need for a device that enables a conventional Freon condensing unit to store and then retrieve thermal energy in the tank using any of the above cited methods of thermal energy storage, depending upon the particular situation at hand.

SUMMARY OF THE INVENTION

It is therefore one object of this invention to provide a thermal energy transfer unit which can be retrofitted to an existing Freon air conditioning system without the requirement that the storage tank be located in close proximity to the condensing unit.

It is another objective of this invention to provide a thermal energy transfer unit which can be retrofitted to several condensing units while sharing a single remote thermal energy storage tank, also allowing the storage tank to use any of the previously described methods of storing thermal energy.

It is another objective of this invention to provide a thermal energy transfer unit that transfers thermal energy from the existing condensing unit to the shared remote thermal energy storage tank during off-peak hours, while allowing recovery of this energy from the common tank during peak hours.

These objects are accomplished by means of the present thermal energy transfer unit (TETU). The TETU provides a method of applying thermal energy conversion and storage to an existing conventional Freon air-conditioner in such a manner that:

1. multiple systems can share a common energy storage tank;
2. the thermal energy storage can be by any one of several known methods; and
3. the thermal energy storage tank can be located remotely from the condensing unit(s).

The TETU uses a non-freezing liquid that never freezes in operation and transfers heat to and from the common storage tank. The liquid is circulated to and from the storage tank and the TETU by means of a pump that is located either at the tank or in the TETU. The TETU can include one or several heat exchangers which transfer heat from the non-freezing liquid to the Freon being circulated by the condensing unit when storing energy in the tank. The TETU uses this same heat exchanger, or others, to transfer the heat in the Freon to the non-freezing liquid (and thus to the tank) when air conditioning is performed without the condensing unit running. This heat transfer, without the use of the condensing unit, is accomplished by condensing the Freon to its liquid state and then pumping the liquid Freon into the building to absorb heat where it vaporizes. After the Freon absorbs heat and vaporizes inside the structure it returns to the heat exchanger(s) where it transfers its heat to the non-freezing liquid and condenses to its liquid state. The TETU also includes a pump means for pumping the liquid Freon when air conditioning is required without the condensing unit. The TETU allows normal air conditioning to be performed by the operation of the condensing unit as if the TETU were not present. In this case, heat is neither being added nor extracted to the non-freezing liquid and the non-freezing liquid pump is not running. The TETU is provided with appropriate valving and controls to accomplish these three functions. By using the TETU with each condensing unit, a common non-freezing liquid can be used to transfer heat to and from a common heat storage tank. By such means heat can be transferred at one air conditioner while another air conditioner is inactive. When using multiple TETU's, all can be transferring heat at the same time or any or all can be inactive.

Additional objects, features and advantages will be apparent in the written description which follows.

BRIEF DESCRIPTION OF THE DRAWINGS

FIGS. 5A–5D are simplified illustrations of several thermal storage systems currently being used in the industry.

DETAILED DESCRIPTION OF THE INVENTION

Figure 1:
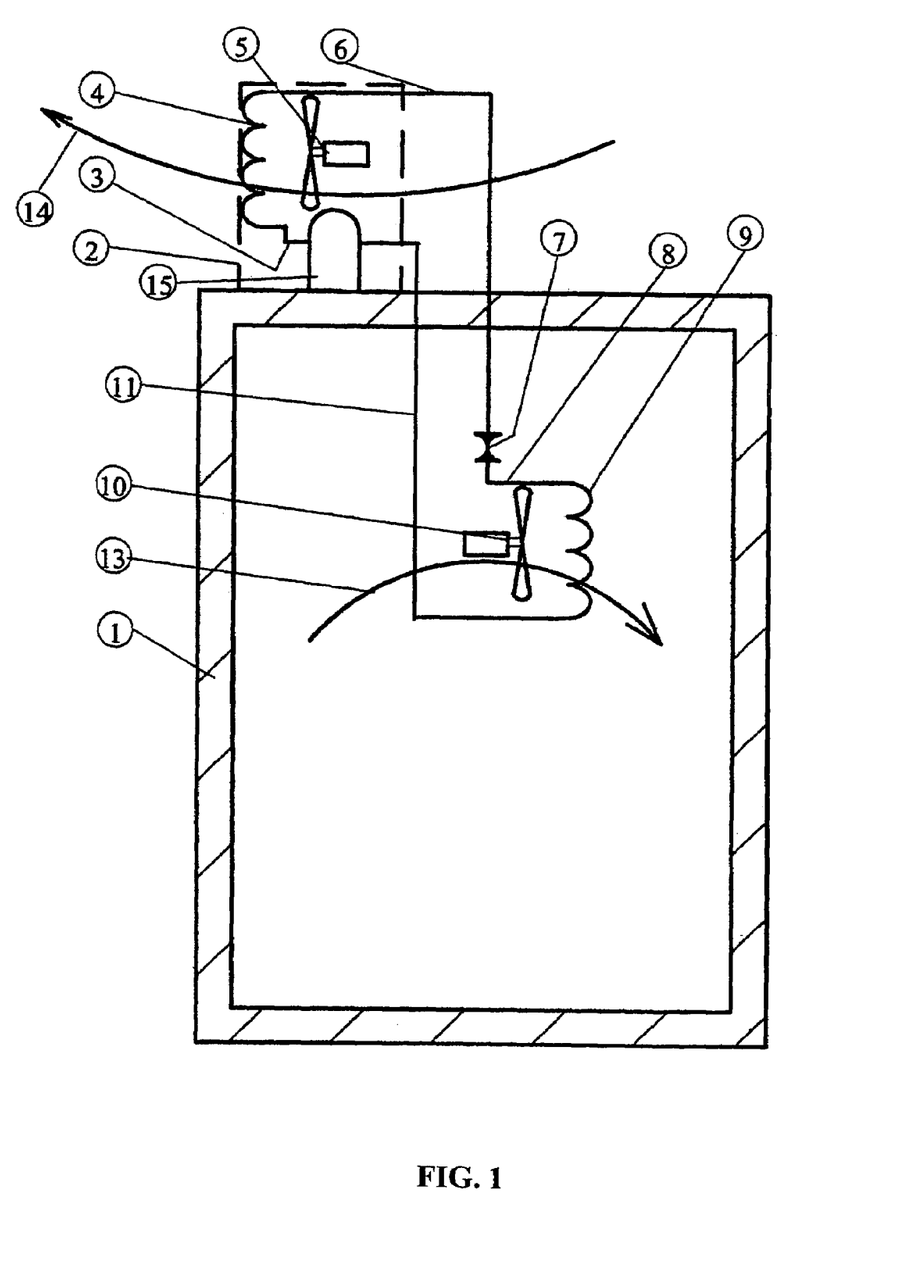
FIG. 1 is a simplified schematic representation of a conventional Freon air conditioning system.

FIG. 1 shows a conventional Freon air conditioning system on a building (1) to be cooled. In the discussion which follows, the term "Freon air conditioning" is intended to describe any conventional mechanical compression refrigeration or air conditioning system using a compressible refrigerant and an expansion device in a closed circuit to achieve a cooling effect. It will be understood that other refrigerants besides "Freon" will be known to those skilled in the relevant industries. The building has an evaporator coil (9), an expansion device (7), and a motorized air mover (10) located inside the building. The air inside the building (13) is moved past the evaporator coil when the motorized air mover (10) is running. Outside the structure (1) a conventional condensing unit (2) is shown. The condensing unit consists of a compressor (15), a condensing coil (4), and a motorized air moving unit (5). Outside air (14) is moved past the condensing coil (4) when the motorized air handler (5) is on and running.

The purpose of the air conditioner is to transfer heat from the inside air (13) to the outside air (14). The compressor (15) is the prime mover and comes on when the inside air temperature rises. The compressor (15) pulls the Freon from the evaporator coil (9) through line (11) where it is in a low pressure and vapor state. The compressor (15) compresses the vapor to a high pressure where it leaves the compressor at a high pressure and an elevated temperature in the vapor state. The compressed Freon then flows to the condensing coil (4) through tube (3). As outside air (14) moves across the condensing coil (4), the elevated temperature of the Freon vapor in the condensing coil (4) causes heat to transfer to the outside air (14). In this manner all of the heat absorbed from the inside air (13) and all the additional heat added to the Freon in the form of work during the compression is rejected to the outside air (14). As this heat is rejected to the outside air (14), the Freon inside the condensing coil (4) condenses to its liquid state at this elevated pressure. The Freon leaves the condensing coil (4) as a high pressure liquid through tube (6) traveling inside the structure to be cooled (1) to the expansion device (7). The expansion device (7) holds back pressure on the liquid.

There are several different types of expansion devices that can be used, all of which cause the pressure entering the device to be much higher than the discharge. The Freon leaves the expansion device at a low pressure through tube (8) and travels to the evaporator coil (9). Inside the evaporator coil (9), the Freon starts to vaporize because of the low pressure and heat added. As it vaporizes, the temperature of the Freon decreases until it is lower than the inside air (13) moving past the coil (9). Because of this low temperature, heat is transferred from the inside air (13) to the Freon as it vaporizes. The evaporator coil (9) and the motorized air mover (10) are sized such that all the Freon is vaporized in the evaporator coil (9). The Freon leaves the evaporator coil (9) through tube (11) returning to the compressor (15) where it again repeats the cycle. Typically the temperature of the inside air (13) is monitored. When the inside air temperature reaches a desired set point, the compressor (15) and motorized air movers (5) and (10) are turned off. When the inside air temperature rises they are turned on.

Figure 2:
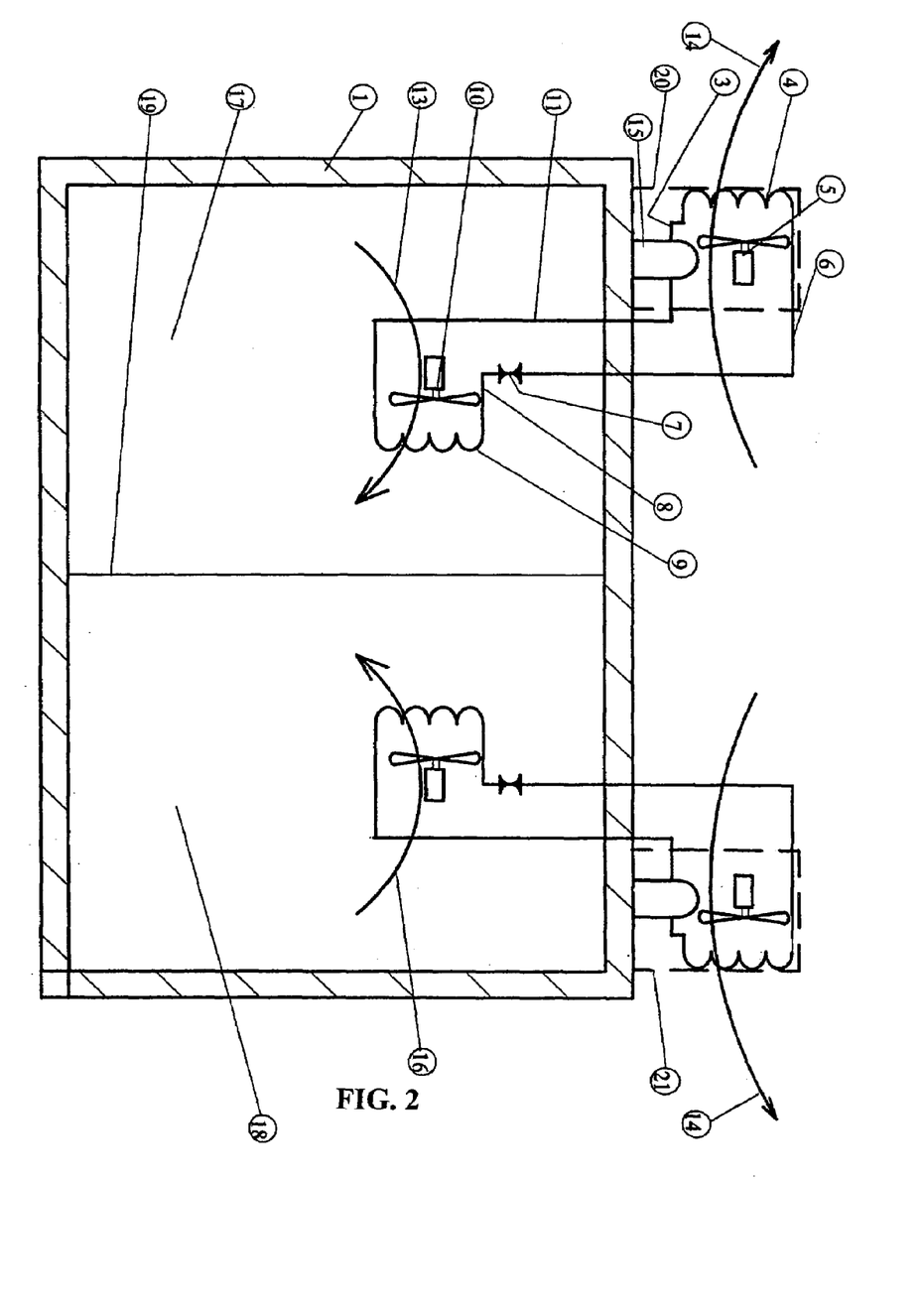
FIG. 2 is a similar schematic representation showing how multiple conventional Freon air conditioning systems are used in a single structure.

FIG. 2 is a schematic diagram showing an application with two zones (18, 19) that are air conditioned by the method shown in FIG. 1. Although one large air conditioner would be less expensive to provide than the two shown, using two smaller air conditioners has several advantages:

(1) one zone can be maintained at a temperature different from the other zone;
(2) one zone does not need to be air conditioned if it is not occupied; and
(3) the temperature of both zones is more easily maintained, eliminating the possibility of slow moving air warming while fast moving air cools.

As a result, it has become common practice to have several air conditioners cooling the same structure. In FIG. 2, the process of removing heat from one zone (17) can be stopped by turning off the air conditioner (20) controlling that zone (17) while the other zone (18) continues to have heat removed because the air conditioner for that zone (21) continues to run. In this manner a structure can be divided into several zones with only the occupied zones being required to use electricity for air conditioning. It is common practice in the industry to see schools, office buildings, etc. with as many as fifty or more different zones and air conditioners being employed.

Figure 3:
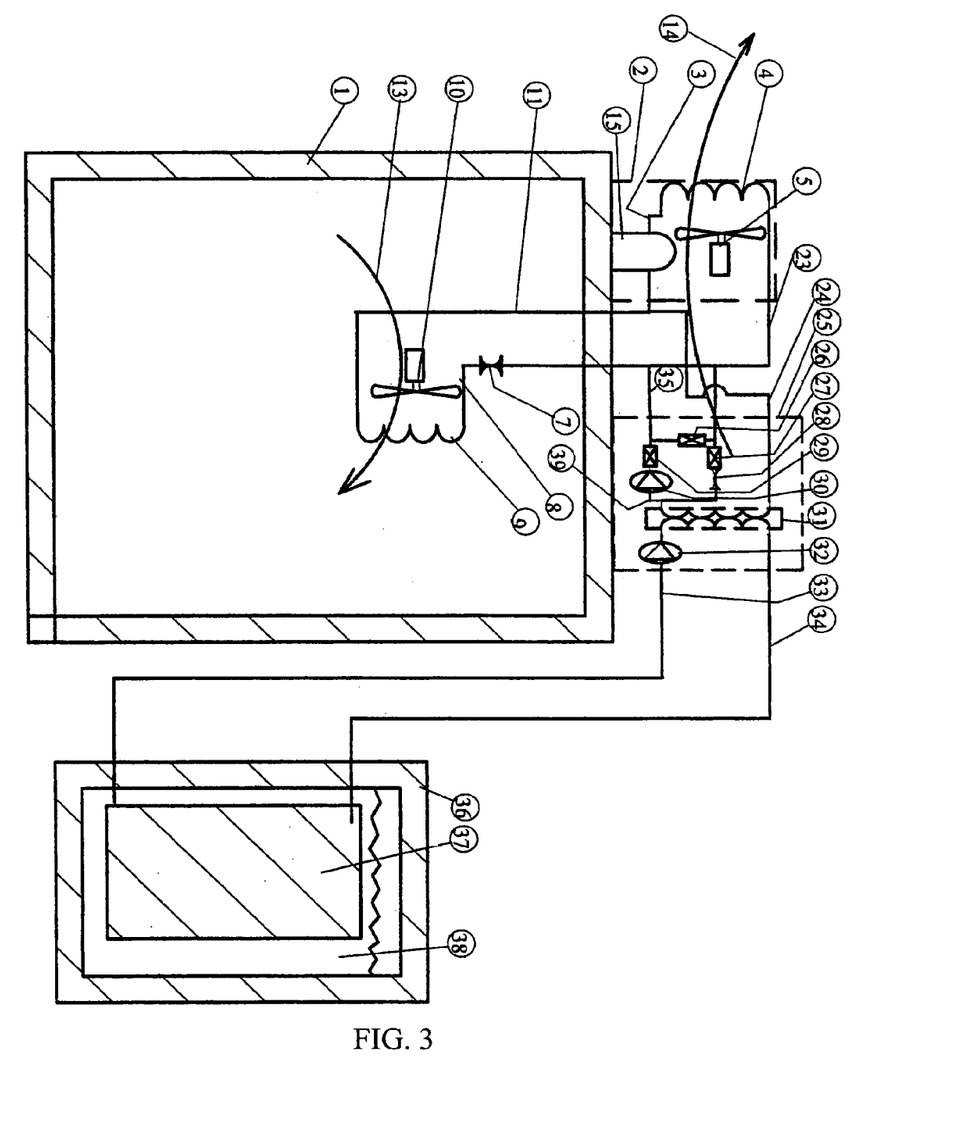
FIG. 3 is a schematic representation, similar to FIG. 1, of one TETU working in conjunction with the conventional Freon air conditioning system and a remote thermal energy storage tank.

FIG. 3 is a simplified schematic illustration of the thermal energy transfer unit (TETU) (25) of the invention used in conjunction with the air conditioner described in FIG. 1 and a thermal storage tank (36). The thermal energy transfer unit (TETU) (25) consists of a means to transfer heat to or from a non-freezable liquid (38) a heat exchanger (31), an expansion device (28), a means of pumping liquid Freon (30), a means of pumping the non-freezable liquid (38) (32), and valves to control the Freon flow (27) (26) (29).

The primary purpose of the TETU (25) is to provide a method to:

1. transfer heat from a thermal storage media (37) in the thermal storage tank (36) to the condensing unit (2) where it is rejected to outside air (14);
2. transfer heat from the inside air (13) of the structure 1 to the thermal storage media (37) in the thermal storage tank (36) without the condensing unit (2) operating; and to
3. allow the condensing unit (2) to transfer heat from the inside air (13) of the structure (1) to outside air (14) in the same way which has been described in FIG. 1 before the TETU and storage tank (36) were added to the system.

Each of the above objectives of the invention will now be described in greater detail beginning with the transferring of heat from the storage media (37) to outside air (14).

The compressor (15) pulls in low pressure vaporized Freon from the common line (24). There the Freon is compressed to a high pressure where it leaves the compressor at a high temperature and in the vapor state through tube (3) and enters the condensing coil (4). The high pressure Freon enters the condensing coil (4) in its vapor state at a high temperature. Because of its high temperature, the Freon transfers the heat it gained from the heat exchanger (31) and the heat it gained from the compressor (15) to the flow of outside air (14) at a lower temperature across the condensing coil. As the Freon loses heat it condenses to its liquid state until it leaves the condensing coil in its liquid state at high pressure. The high pressure liquid Freon leaves the condensing coil through tube (23) past closed valve (26) and through open valve (27) to the expansion device (28). The expansion device (28) holds back pressure on the Freon and maintains the high pressure on its inlet side. The Freon leaves the expansion device (28) at low pressure through tube (39). It cannot enter the pump (30) because valve (29) is closed. Rather, the Freon enters the heat exchanger (31) at a low pressure and starts to vaporize at a low temperature. Because of the low temperature, it absorbs heat from the heat exchanger (31) until it is completely vaporized at low pressure.

The low pressure vaporized Freon leaves the heat exchanger and returns to the compressor suction through common tube (24) where it compresses again and repeats the cycle. While the condensing unit (2) is running the pump (32) is running. The pump (32) is pumping a non-freezing liquid (38) into the heat exchanger (31) where heat is removed from the non-freezing liquid (38). The non-freezing liquid leaves the heat exchanger (31) and enters the thermal energy storage tank (36) through tube (34) at a lower temperature than it left the tank (36) because of the heat lost in the heat exchanger (31). Once in the tank (36) the non-freezing liquid (38) absorbs heat from the thermal storage media (37). The non-freezing liquid (38) leaves the tank at a higher temperature than it entered the tank because of the heat it gained from the storage media (37). The non-freezing liquid (38) leaves the tank through tube (33) and returns to the pump (32) suction where it repeats the cycle. By this means heat is transferred from the media (37) to the heat exchanger (31) and then to the Freon where it is rejected to the outside air (14) while the condensing unit (2) is running.

The transfer of heat from the inside air (13) to the thermal storage media (37) is accomplished by the TETU (25) without the condensing unit (2) operating or consuming any electricity. The pump (32) moves the non-freezing liquid (30) in a cold state through the heat exchange (31). Because the non-freezing liquid (38) is colder than the Freon in the heat exchanger (31) the non-freezing liquid absorbs heat from the Freon. The non-freezing liquid leaves the heat exchanger (31) at a higher temperature than it entered the heat exchanger (31) because of the heat it gained from the Freon. The non-freezing liquid (38) leaves the heat exchanger (31) through tube (34) and enters the tank (36). Inside the tank (36) the non-freezing liquid (38) transfers the heat it gained in the heat exchanger (31) to the storage media (37) because it is at a higher temperature than the media (37). The non-freezing liquid (38) leaves the tank (36) at a lower temperature than it entered the tank (36) because of the heat rejected to the storage media (37). The non-freezing liquid leaves the tank through tube (33) and returns to the pump (32) where the cycle is repeated. While pump (32) is running the heat exchanger (31) is transferring heat from the low pressure vaporized Freon in the heat exchanger. This heat transfers because the temperature of the non-freezing liquid in the heat exchanger is lower than the low pressure vaporized Freon.

As heat is lost from the low pressure Freon in the heat exchanger (31) it condenses to its liquid state. The low pressure liquid Freon leaves the heat exchanger (31) through common tube (39). It can't go through the expansion devise (28) because valve (27) is closed. It enters the pump (30). The pump moves the Freon liquid through open valve (29), past closed valve (26) into tube (35). The liquid Freon enters the expansion device (7) through tube (35). The expansion device holds back pressure on the liquid entering the device. The pump must develop enough pressure to overcome the resistance offered by the expansion device (7). It is noted that the pump would be required to put out less pressure if there were a bypass around this expansion device (7), another expansion device in parallel to device (7), or a means to disable the expansion device (7) such that it held less back pressure in this mode. The Freon leaves the expansion device (7) at low pressure through tube (8) and enters the evaporator coil (9) at a low pressure. As the low pressure Freon enters the evaporator coil (9), it starts to vaporize at a temperature lower than the inside air (13) moving past the coil (9) with the motorized air mover (10) operating. Because the Freon is at a lower temperature than the air (13), heat is transferred from the air to the Freon until all the Freon is vaporized in the coil (9). The Freon leaves the evaporator coil (9) in its vapor state and returns to the heat exchanger through tube (11) where the heat absorbed from the inside air (13) is transferred to the non-freezing liquid (38) and thus to the storage media (37). When the temperature of the inside air (13) drops to the desired value, the pumps (30) and (32) stop. When the temperature rises above the desired set point, the pumps again start to operate.

Heat is transferred from the inside air (13) inside the structure (1) to the outside air (14) the same way as has been previously described with respect to FIG. 1 as if the TETU and tank (36) were not present. When valves (28) and (29) are closed Freon travels through open valve (26) when pumps (30) and (32) are off. The Freon cannot enter the heat exchanger because of the closed valves. It is understood that some Freon may accumulate in the heat exchanger during this mode, thereby reducing the Freon mass in circulation to the compressor. This shortage can be easily adjusted for with the use of an accumulator in the system. Such accumulators are commonly used in the air conditioning industry for such variances in mass flow rate and can be viewed in the "American Society of Heating, Refrigeration, and Air Conditioning Engineers Handbook 1998–2001."

Figure 4:
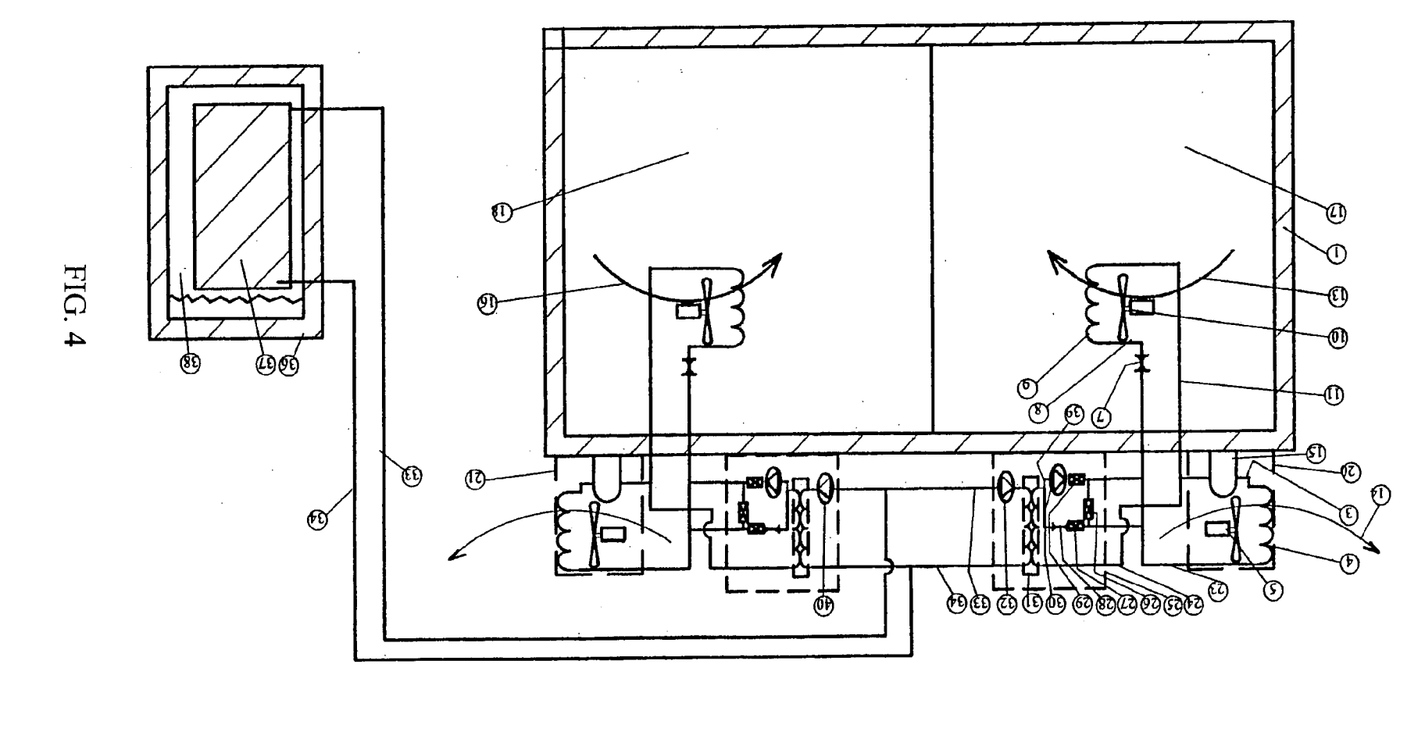
FIG. 4 is a schematic diagram of several TETU's working in conjunction with the multiple conventional Freon air conditioning systems described by FIG. 2 and a single common remote thermal storage tank.

FIG. 4 is an illustration of TETU's (25) and (39) installed on the multiple condensing units illustrated in FIG. 2. It can be easily seen that one remote thermal energy storage tank (36) is shared by the multiple units. Each zone can be cooled separately in the same fashion as illustrated in FIG. 2. Each zone can be cooled separately with the operation of each separate TETU. Even though all units share the same thermal energy storage tank, all units can run at the same time or run alone without the others running. In the same manner, all units can transfer heat from the tank's thermal storage media (37) to the outside air at the same time or one unit can transfer with the others units being off. One zone can be air conditioned by the conventional method described in FIG. 1 while others are transferring heat from the media (37) to outside air (14).

FIGS. 5A–5D illustrate several examples of conventional methods of storing thermal energy. All include an insulated tank (36), a liquid (38) that is circulated through the tank to add or extract heat, a substance to store and withdraw the heat (37), an inlet line (34) for the liquid (38) and an outlet line (33) for the liquid.

In FIG. 5A the circulation liquid (38) is the same as the storage substance (37). Thermal storage is accomplished by simply lowering the temperature of the liquid without a phase change (conversion from liquid to solid). The advantage of this method is simplicity. The disadvantage is the large amount of liquid required for storage (only one BTU per degree Fahrenheit temperature change for one pound of water compared to 144 BTU per pound of water when changed to ice).

FIG. 5B is an example of the "ice on pipe" thermal energy storage method. The tank (36) has a coil (39) that runs throughout the storage media (37). The circulation liquid (38) is circulated through the coil (39) with heat being added or extracted outside the tank. When heat is being extracted from this liquid (38) heat is transferred from the storage substance (37) until it changes phase to its solid state. This is a large amount of heat transfer (144 BTU per pound when water is used). When heat is being absorbed into the circulating liquid (38) outside the tank, the temperature of this liquid rises, causing heat to be transferred through the coil (39) into the storage media (37). The advantage of this method is the large amount of heat stored per volume of tank space (8,900 BTU per cubic ft when water is used). The disadvantage is the cost and complexity of the coil (39) and heat exchange problems around the coil (39).

Figure 52:
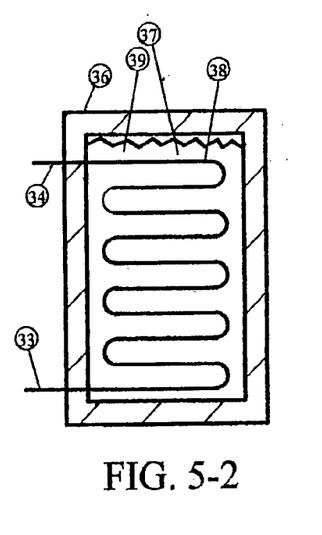
Figure 53:
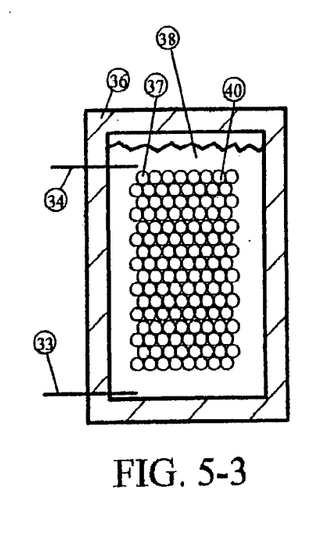
Figure 54:
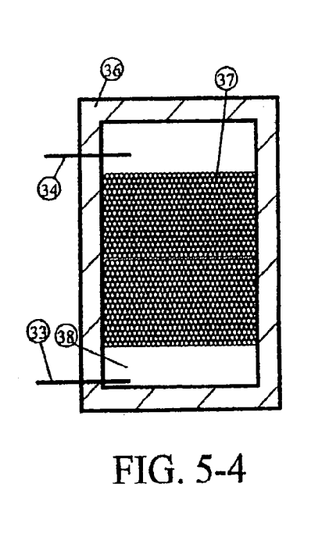

FIG. 5C is an example of "ice ball storage". An example of ice ball storage can be understood by reviewing U.S. Pat. No. 4,768,579, issued to Patry. The tank (36) contains a plurality of plastic balls (40), each filled with a storage substance (37) which changes state. The balls are submerged and surrounded by the circulated liquid (38). If heat is extracted from the circulating liquid (38) outside the tank (36), the circulating liquid (38) becomes cold and extracts heat inside the tank from the ice balls (40) until the media (37) inside the balls (40) freezes. When heat is being added to the circulating liquid (37) outside the tank, the temperature of the liquid rises. This causes heat to be transferred (added) to the ice balls (40) until they thaw (return to their liquid state). The advantage of this method is the elimination of the coil in FIGS. 5-2 with nearly the same results. The disadvantage is the cost of the balls (40).

FIG. 5D is a simplified representation of an ice slurry method of thermal storage. This method suspends the thermal storage media (37) chemically in the circulation liquid (38). The storage media (37) undergoes a change of state to its solid state and remains in the tank as solid particles when heat is extracted from the circulating liquid (38) outside the tank (36). When heat is added to the circulation liquid (38) outside the tank, the circulation liquid (38) temperature rises and causes heat to be transferred inside the tank to the frozen particles of storage media (37) until they thaw back to their liquid state. When they return to their liquid state, they are dissolved by the circulation liquid (38) and circulate with the circulation liquid (38). An example of this type of thermal storage is ice slurry beverages sold by convenience stores where the storage media (37) is water and the circulating liquid (38) is syrup. The advantage of this method is the elimination of the need for a coil or ice balls inside the tank while still achieving change of state storage. The disadvantage of this method is a problem of coating the heat exchanger outside the tank with frozen storage media (37) when extracting heat from the circulating liquid (38).

There are several variations of each of the discussed methods and all are currently being used for thermal storage.

Figure 6:
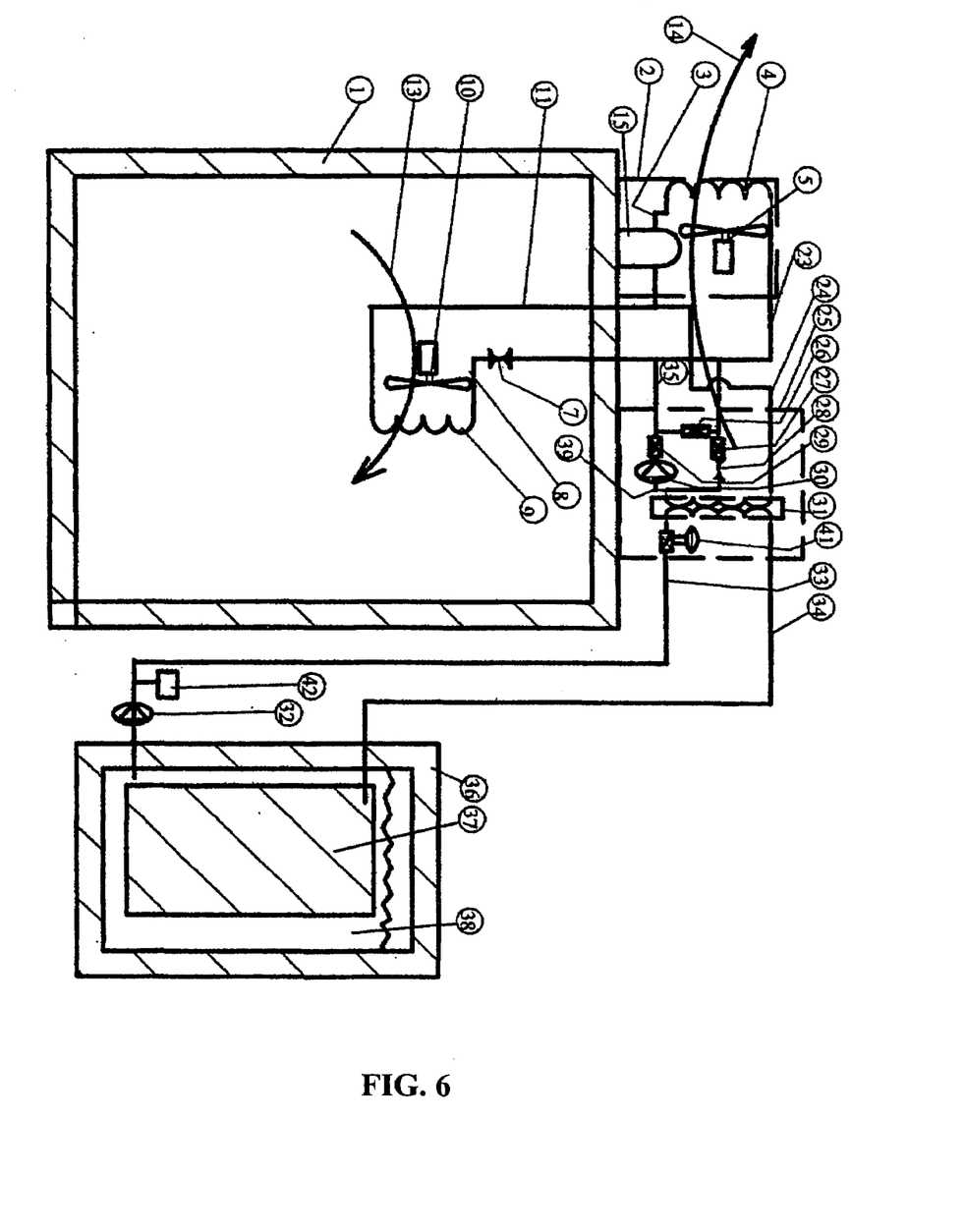
FIG. 6 is a diagrammatic representation of the TETU operation of FIG. 3 with a pump located by the storage tank and flow controlled by a flow control valve.

FIG. 6 is a description of the operation of the TETU working as FIG. 3 describes with the exception of the non-freezing liquid pump (32) being moved to the storage tank discharge and replaced with a modulating control valve (41). The operation of the TETU is identical to that described by FIG. 3 except the modulating control valve (41) opens or closes depending on the load of heat transfer required by the heat exchanger (31). This loading can be monitored by conventional methods of monitoring the temperature and/or pressure of the lines (34), (24), and/or (35). When the load increases valve (41) opens and when it falls, valve (41) would tend to close. This action would cause more or less flow rate of the circulating non-freezing liquid. As this valve (41) opens or closes, the pressure changes in line (33) feeding the valve. This pressure change is sensed by the pressure transducer (42) which in turn changes the pumping rate of the pump (32).

Figure 7:
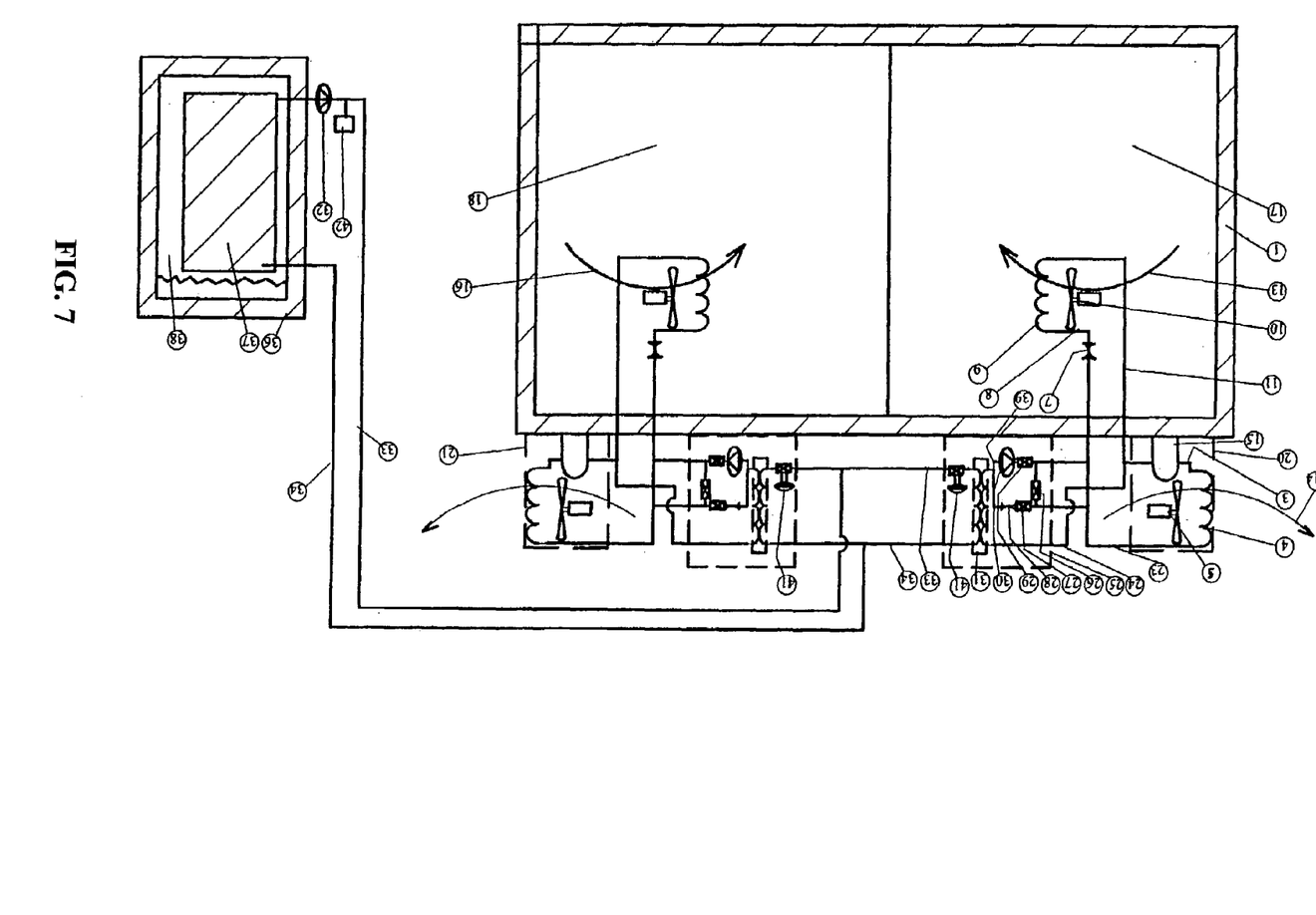
FIG. 7 is a diagrammatic representation of the TETU operation of FIG. 4 with one liquid pump located at the tank and a flow control valve within each TETU to control the flow rate.
Figure 51:
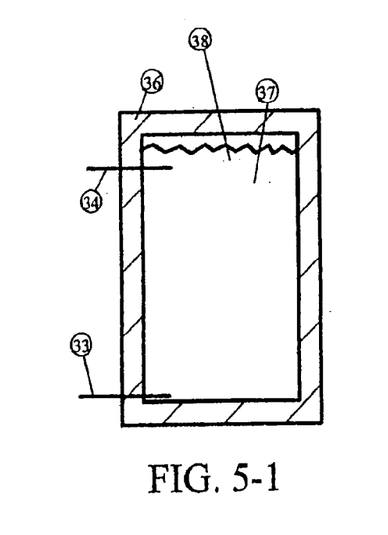

FIG. 7 is a description of the operation of multiple units running as described by FIG. 4 with the pumps being substituted as described by FIG. 6. It can easily be seen that pump (32) whose speed is controlled by pressure transducer (42) varies the flow rate in lines (33) and (34) as the total demand of all heat exchangers (31) varies.

While the invention has been shown in several of its forms, it is not thus limited but is susceptible to various changes and modifications without departing from the spirit thereof.

What is claimed is:

1. A method for cooling inside air within a structure, the method comprising the steps of:
    providing a thermal energy transfer unit for applying energy conversion and storage to an existing conventional Freon air-conditioning system associated with the structure, where the thermal energy transfer unit includes a thermal storage media located in a thermal storage tank, the method comprising the steps of:
    utilizing the thermal energy transfer unit to transfer heat from the thermal storage media in a thermal storage tank to a condensing unit of the conventional Freon air-conditioning system where it is rejected to outside air;
    transferring heat from inside air within the structure to the thermal storage media in the thermal storage tank without the condensing unit operating; and
    thereafter, allowing the condensing unit to transfer heat from the inside air of the structure to outside air in the same manner that such heat transfer was accomplished before the addition of the thermal energy transfer unit and thermal storage tank were added to the existing conventional Freon air-conditioning system.

2. The thermal energy transfer unit of claim 1, wherein the thermal energy transfer operates to duplicate the operation of a conventional air conditioner condensing unit while operating in the air conditioning system, but without the conventional air conditioner condensing unit operating.

3. A method of air conditioning a structure, the method comprising the steps of:
    locating a thermal energy transfer unit in proximity to a structure to be cooled, for applying energy conversion and storage to an existing conventional Freon air-conditioner, including the steps of:
    locating a thermal storage tank remotely from the thermal energy transfer unit;
    providing a pump for circulating a non-freezing liquid to and from the storage tank for transferring heat to and from the storage tank;
    wherein the thermal energy transfer unit includes a heat exchanger to transfer heat from the non-freezing liquid to Freon being circulated by a condensing unit when storing energy in the tank and wherein the same heat exchanger is used to transfer the heat in the Freon to the non-freezing liquid, and thus to the tank, when air conditioning is performed without the condensing unit running, the heat transfer without the use of the condensing unit being accomplished by condensing the Freon to a liquid state and then pumping the liquid Freon into the structure to absorb heat where it vaporizes, and wherein the Freon is then returned to the heat exchanger where it transfers its heat to the non-freezing liquid and condenses to its liquid state after it absorbs heat and vaporizes inside the structure.

4. The method of claim 3, wherein the thermal energy transfer unit includes a pump means for pumping the liquid Freon when air conditioning is desired but without the condensing unit operating.

5. The method of claim 4, wherein the thermal energy transfer unit includes a control means which allows normal air conditioning to be performed by the operation of the condensing unit as if the thermal energy transfer unit were not present, in which case heat is neither being added to nor extracted from the non-freezing liquid and the non-freezing liquid pump is not running.

6. The method of claim 5, wherein a plurality of air conditioners and associated thermal energy transfer units are connected to a single common thermal energy storage tank.

7. The method of claim 3, wherein the thermal energy storage tank uses a method for storing energy selected from the group consisting of: lowering the temperature of a liquid located within an insulated tank; using an ice on pipe storage tank; using an ice ball storage tank; and using an ice slurry method for storing thermal energy.

8. A thermal energy transfer unit, comprising:
    at least one heat exchanger for transferring heat from a conventional air conditioning system having a mechanical compressor in a closed loop refrigeration circuit to a liquid medium that, in turn, transfers that heat to or from at least one thermal storage tank;
    pump means for circulating the liquid medium;
    control means for controlling the flow of the liquid medium to the conventional air conditioning system to enable the transfer of heat to the thermal storage tank without the air conditioner compressor running.

9. The thermal energy transfer unit of claim 8, further comprising valve means to start, stop and regulate the flow of heat from the conventional air conditioning system to or from the thermal storage tank, the valve means also functioning to allow heat to be transferred by the air conditioning system as if the thermal energy transfer unit and thermal storage tank were not present in the system.

10. The thermal energy transfer unit of claim 9, further comprising:
    a plurality of thermal energy transfer units used in association with a plurality of air conditioning systems to transfer heat to or from one or more shared thermal energy storage tanks.

* * * * *

(12) INTER PARTES REEXAMINATION CERTIFICATE (0187th)
United States Patent
Anderson (10) Number: US 7,152,413 C1
(45) Certificate Issued: Sep. 7, 2010

(54) THERMAL ENERGY TRANSFER UNIT AND METHOD (75) Inventor: R. David Anderson, Wichita Falls, TX (US)

(73) Assignee: Trinity Thermal Systems, L.P., Wichita Falls, TX (US)

Reexamination Request:
No. 95/000,294, Aug. 30, 2007

Reexamination Certificate for:
Patent No.: 7,152,413
Issued: Dec. 26, 2006
Appl. No.: 11/297,596
Filed: Dec. 8, 2005

(51) Int. Cl.
*F25D 17/02* (2006.01)

(52) U.S. Cl. .................................... 62/118; 62/434
(58) Field of Classification Search .................. None
See application file for complete search history.

(56) References Cited

U.S. PATENT DOCUMENTS

| | | |
|---|---|---|
| 4,735,064 A | 4/1988 | Fischer |
| 5,647,225 A | 7/1997 | Fischer et al. |
| 7,162,878 B2 | 1/2007 | Narayanamurthy et al. |
| 2005/0262870 A1 | 12/2005 | Narayanamurthy et al. |
| 2006/0037329 A1 | 2/2006 | Narayanamurthy |

OTHER PUBLICATIONS

"Application Data Sheet for Split System Air Conditioners & Heat Pumps," 690.01–AD1V (1296), Unitary Products Group (1998).

*Primary Examiner*—David O. Reip (57) ABSTRACT

A thermal energy transfer unit is provided for conventional Freon air conditioning. One or several thermal energy transfer units are operatively interconnected to one or several conventional air condition systems and share a common energy storage tank. Each thermal energy transfer unit converts energy from the compressor and condensing coil of the conventional air conditioner and stores it in the common energy storage tank when electricity is in low demand. Each thermal energy transfer unit retrieves stored energy from the common storage tank and provides air conditioning without the use of the compressor when electricity is in high demand. Each thermal energy transfer unit can be disabled to allow the air conditioning unit to perform as if they and the energy storage tank were not connected. One or all of the units can be disabled without affecting the performance or purpose of the others.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 1-7, 9 and 10 is confirmed.

Claim 8 is cancelled.

* * * * *